US006643504B1

(12) United States Patent
Chow et al.

(10) Patent No.: US 6,643,504 B1
(45) Date of Patent: Nov. 4, 2003

(54) AUTOMATIC WIRELESS SERVICE ACTIVATION IN A PRIVATE LOCAL WIRELESS SYSTEM

(75) Inventors: Albert T. Chow, Hillsdale, NJ (US); Richard Henry Erving, Piscataway, NJ (US); Robert Raymond Miller, II, Morris Township, NJ (US); Christopher W. Rice, Parsippany, NJ (US); Jesse Eugene Russell, Piscataway, NJ (US); Wenchu Ying, Cedar Knolls, NJ (US)

(73) Assignee: AT&T Corp., New York, NY (US)

( * ) Notice: Subject to any disclaimer, the term of this patent is extended or adjusted under 35 U.S.C. 154(b) by 502 days.

(21) Appl. No.: 09/612,802

(22) Filed: Jul. 10, 2000

(51) Int. Cl.[7] ................................................ H04M 1/66
(52) U.S. Cl. ..................... 455/411; 455/410; 455/443
(58) Field of Search ................................. 455/410, 411, 455/552, 553, 63, 426, 443

(56) References Cited

U.S. PATENT DOCUMENTS

| | | | | | |
|---|---|---|---|---|---|
| 5,732,360 | A | * | 3/1998 | Jarett et al. ................. | 455/552 |
| 5,915,219 | A | * | 6/1999 | Poyhonen ..................... | 455/435 |
| 5,920,818 | A | * | 7/1999 | Frodigh et al. ............... | 455/443 |
| 5,924,030 | A | * | 7/1999 | Rautiola et al. .............. | 455/426 |
| 5,960,365 | A | * | 9/1999 | Leih et al. .................... | 455/552 |
| 6,011,960 | A | * | 1/2000 | Yamada et al. ................. | 45/77 |
| 6,052,595 | A | * | 4/2000 | Schellinger et al. ......... | 455/450 |
| 6,243,572 | B1 | * | 6/2001 | Chow et al. .................. | 455/408 |
| 6,418,313 | B1 | * | 7/2002 | Wallstedt ..................... | 455/434 |
| 6,421,328 | B1 | * | 7/2002 | Larribeau et al. ............ | 370/329 |
| 6,434,399 | B1 | * | 8/2002 | Kamperschroer ............. | 455/524 |
| 6,470,179 | B1 | * | 10/2002 | Chow et al. .................. | 455/406 |
| 6,493,550 | B1 | * | 12/2002 | Raith ........................... | 455/422 |

* cited by examiner

Primary Examiner—Nay Maung
Assistant Examiner—Trinh Tan

(57) ABSTRACT

Automatic activation (i.e., first time access) of digital wireless/cellular mobile telephones with a private/localized wireless/cellular system (i.e. a secondary system) occurs within an area having an overlapping macrocellular primary wireless communication system (i.e., a dominant system). Operation of the secondary access procedure is achieved by shielding/masking an access and authentication process for the secondary system from interference from the control signal levels of the dominant wireless communication system. During the first time access, the secondary system is supplied with the SID and MIN and ESN numbers for authentication and resultant access.

19 Claims, 8 Drawing Sheets

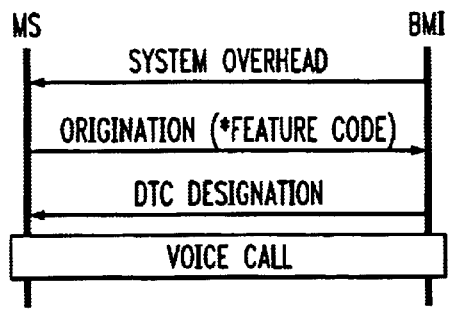
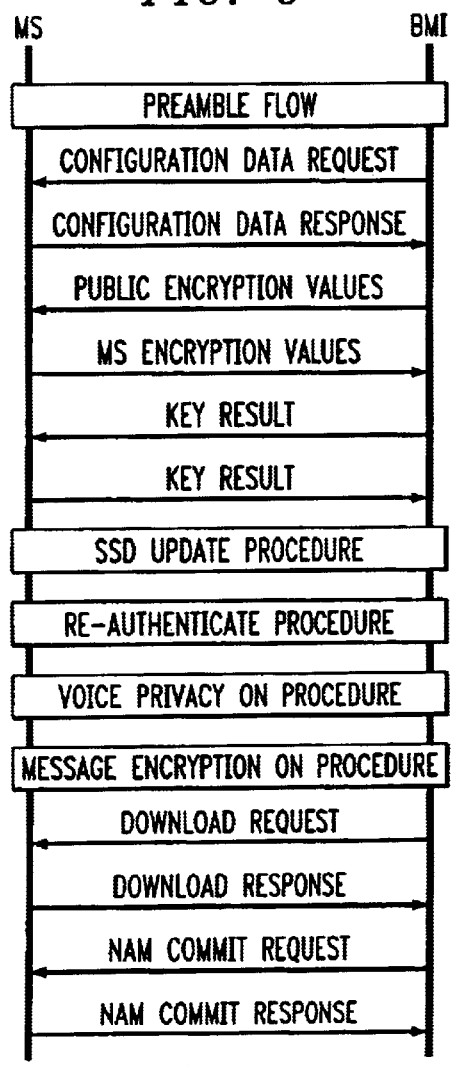

AUTOMATIC WIRELESS SERVICE ACTIVATION IN A PRIVATE LOCAL WIRELESS SYSTEM

FIELD OF THE INVENTION

This invention addresses the problem of activating service for a wireless telephone in a wireless system other than the normal home system of that wireless telephone or a system that might grant access as a roaming type activation. In a particular aspect it concerns activation of a wireless telephone to operate in a local or secondary system, overlapped by a macro or primary system. Activation in a private or secondary wireless system for a permanent or a limited-time duration is considered. It specifically relates to first time activation of digital wireless/mobile telephones. A method of using a wireless handset's automatic activation features for obtaining service on such a wireless system is described. In one particular aspect, the invention addresses provisioning of service to in-building/campus wireless users in accord/compliance with pre-existing standards. The wireless system may be cellular, PCN, PCS, or a similar mobile radio system

BACKGROUND

A wireless telephone typically needs to be activated before it can operate in a particular wireless system. Normally this process is required only once since subsequent uses of the wireless telephone in that system is already authorized. Access in different systems is generally covered by roaming procedures allowing use of the wireless telephone as it moves to another system. This granting of use permission is dependent upon agreements between different systems and access to databases to verify the legitimacy of the wireless telephone operating out of its home territory.

There are a large number of localized and/or private wireless systems which are not part of arrangements permitting roaming and may indeed operate within a territory already covered or overlaid by other carriers including the home carrier of a wireless telephone seeking use of a localized and/or private wireless system. Such localized and/or private wireless systems operate at low signal levels compared to outdoor macrocell systems. These localized and/or private systems are frequently found within buildings and on campus sites.

TIA/EIA-136, a cellular standard covering digital cellular TDMA systems, explicitly provides for providing service to private user communities. Service is granted by means of a Private System IDentification (PSID) code entered into each wireless telephone requesting service from the private/local wireless system. This PSID code must be entered into the handset, which is requesting service. The process is elementary but it is not simple in real economic terms. For example to insert the PSID into the wireless telephone manually is elementary and at the same time both inefficient and costly especially in the circumstance of initially providing service to a 'large' number of users. Even on an occasional basis a structured entry process requiring experienced human intervention must still be maintained. This procedure must include decisions regarding control over duration of registry and extent of use privileges offered.

Service provisioning, by over-the-air downloading of required information, is available on many macrocellular cellular/wireless systems of public carriers. In one cellular system a telephone number and System ID (SID) code is assigned and downloaded to a wireless/cellular telephone and the user enters the related information in response to a visually presented operation menu provided by the wireless telephone. The registration is completed with a specific sequence of steps which include searching a range of digital macrocellular RF control channels; latching on to the strongest control channel received; and then installing activation and authentication information into the wireless telephone over the air.

The key to this automatic setup procedure, in part, is the ability of the wireless/cellular phone to preferentially seek (i.e., tune-in to) the strongest macrocellular setup channel in the locality. This complicates the desire for automatic setup procedures for private and local wireless/cellular systems. The first obstacle is the relatively high signal level of the macrocellular system compared to the private local/system. The relatively high signal level of the macrocellular system overrides any setup channel of the private/local system rendering it impossible for the wireless telephone to latch onto the local/private system.

At present there is no way of automatically provisioning a wireless/mobile digital phone (e.g., digital cellular telephone) to a secondary wireless communication system in an area radiated by a more powerful dominant wireless communication system (i.e., a macrocellular system). The macrocellular signal strength overrides any provisioning signal provided by the secondary system.

SUMMARY OF THE INVENTION

A method and apparatus is provided permitting individual wireless telephones (i.e., cellular) use of the wireless telephone's inherent downloading capability to permit automatic activation to achieve registration and activation to a secondary (i.e., private) wireless communication system (e.g., cellular system) by downloading directly into the wireless telephone the necessary system information.

Automatic activation (i.e., first time access) of digital wireless/cellular mobile telephones with a private/localized wireless/cellular system (i.e. a secondary system) occurs, in accord with the invention, within an area having an overlapping macrocellular primary wireless communication system (i.e., a dominant system). Operation of the secondary access procedure, to register and receive service from the secondary system, is achieved by shielding/masking an access and authentication process for the secondary system from interference from the control signal levels of the dominant wireless communication system. During the first time access, the secondary system is supplied with the PSID and MIN and ESN numbers needed for authentication and resultant access.

In particular the process requires masking only during the authentication and access processing allowing the application of shielding/masking for this process only. In one masking arrangement the antenna for the secondary system used for access and authentication procedures radiates a control channel signal that exceeds a radiation level of the dominant system control channel only within a very short distance from an access antenna of the secondary system. For example, in some situations, this distance is about an inch or less. Hence when the wireless telephone is within this distance the secondary system acts as the dominant system in the region for access and authentication procedures.

In another embodiment the antenna, of the secondary system, dedicated for access processes may be in a shielded enclosure which blocks radiation from the dominant system within the enclosure. Such a shield could be a conductive grid formed into a box enclosure into which the wireless telephone may be inserted and placed next to an antenna of the secondary system used for access procedures.

In one exemplary embodiment the secondary system uses identical signal formats and frequencies for access as used by the overlapping dominant system. These may be defined by a cellular standard such as ANSI TIA/EIA-136, which provides standards for providing services to private user communities. In a specific embodiment the secondary system scans the overhead channels of the dominant system and replicates these signals and frequencies for creating its own overhead and control channels.

In the disclosed embodiment the secondary wireless communication system operates in a region covered by an overlapping dominant wireless communication system. The secondary system uses access signals and techniques in at least one access method identical to those of the dominant system (i.e., TIA/EIA-136 procedures). It may, in some instances, use different access methods (i.e., analog processing) not used by the dominant system. The secondary system special access mode is operative for access to new wireless telephones needing initial authentication and access data to be inserted into the wireless phone to enable operation in the secondary system. Access is enabled only if the phone is positioned so that the received radiation from the access antenna of the secondary system is stronger than the ambient radiated signal strength of the dominant system when the wireless telephone is positioned properly relative to the access antenna of the secondary system.

In a variation of the disclosed embodiments a secondary/microcellular system may be interconnected with the dominant/macrocellular system so that the two interwork with each other. In a particular aspect an inter/intranet-connected database may be utilized by both systems. Such a database may be readily accessed by individuals requesting access to the secondary system through an internet/intranet connection. Such a database could be used to provide mobile station phone numbers and additionally provide other service provider information.

DESCRIPTION OF THE DRAWING

FIGS. 5, 6, 7 and 8 disclose message flow procedures for supporting OATS procedures;

DETAILED DESCRIPTION

Figure 1:
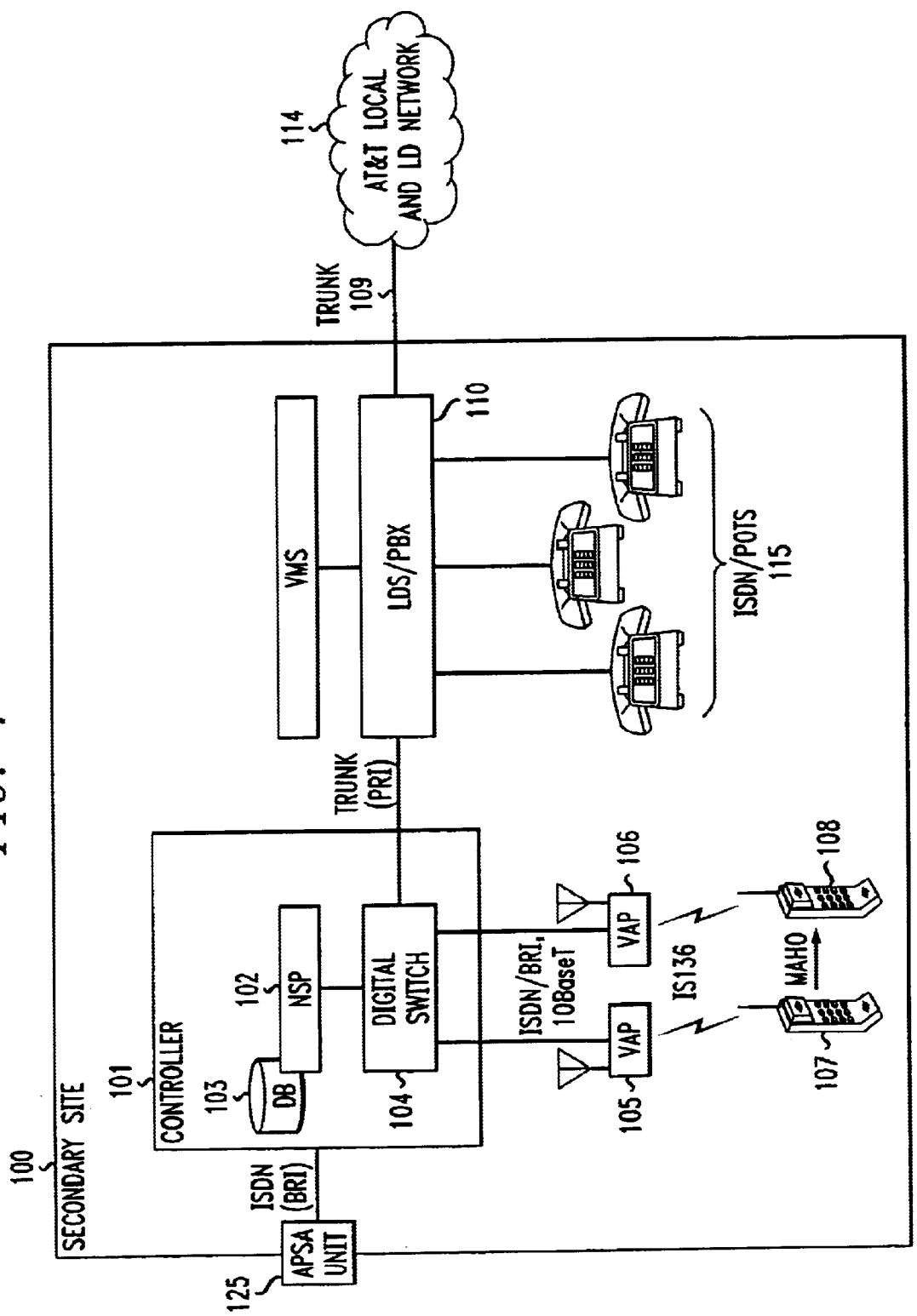
FIG. 1 is a block schematic of an illustrative service architecture of a wireless communication system, which may be a secondary system subject to ambient control signal radiation of an overlapping dominant system.

An exemplary private wireless communication (i.e., secondary) system 100 is illustrated in FIG. 1. System 100 is considered to be overlapped (i.e., in an area covered by radiated signals of another system) by a public or primary wireless telephone (i.e., dominant) system having operative and access signal much higher in signal strength than used by the system 100. The overlapping systems are considered to be primarily digital with some being analog. They may operate according to TIA/EIA-136, IS-95, IS-54, EDGE or other standards. The private system 100 is considered to be an exemplary embodiment operating under an TIA/EIA-136 standard although it is to be noted that the invention contemplates operation under other standards (e.g., including GSM, DECT, etc). Due to the high signal strength of the dominant system the user of a wireless telephone is unable to connect to the secondary system 100.

A controller 101 directs operation of the secondary (i.e. primary/private) wireless system. It includes a Network Service Platform (NSP) 102, a database 103 and a digital switch 104. Controller 101, with its functional sub-units, performs such functions as digital switching and network operations. These network operations include call set-up, feature applications, maintain a subscriber database, security functions, fault detection and resolution, and RF management functions. NSP 102 is a server, which with its associated database 103 provides operational rules and regulations and monitors/identifies the various usage/users.

Two Voice Access Ports (VAP) 105 and 106 act as system base stations to supply wireless service to wireless telephones 107 and 108 operating within the exemplary private wireless communication system 100. VAP 105 is connected to the digital switch 104 via a line interface, which could be an ISDN/BRI connection, a 10Base T connection or any other standard telephone lines (e.g., POTS). VAP 106 is likewise connected to the digital switch 104 via an ISDN/BRI connection, a 10Base T connection, or any other standard telephone lines (e.g., POTS). The VAPs are assumed to be small (i.e., miniature) base stations operating similarly (i.e., in principle) to those of public wireless communications systems. In the illustrative embodiment the controller is co-located with the operative area within the radiation area of the private/secondary system. In an alternative arrangement the controller 101 may be located with NSP 102 connecting to a local digital switch at a telephone central office (i.e., replacing digital switch 104).

The ISDN (Integrated Services Digital Network) connection conforms to a set of standards for digital transmission over copper wire and other transmission media. The suggested service level is the BRI (Basic Rate Interface) level intended for small private users and includes two B (bearer) channels (64 Kbps) and one D (delta) channel (16 Kbps). 10base-T is a carrier medium connection (e.g., twisted pair wire) used by many Ethernet systems operating at 10 Mbps. Since the aforementioned transmission media are well known to those skilled in the art no further description is believed necessary.

The digital switch 104 is connected to a Local Digital switch 110, which handles digital signals passed to and from digital switch 104. LDS 110 may be a public switch located at a central office or a PBX (Private Branch eXchange) on customer premises. These various switching arrangements are well known in the art and need not be discussed in detail. Various line telephones 115 may be connected to LDS 110. A trunk 109 connects LDS 110 to a public network 114.

Automatic Private Service Activation (APSA) device 125 is shown connected by an ISDN/BRI connection to the controller 101. APSA 125 is essentially a miniature base station of the local system 100 which has been modified to permit a wireless telephone to communicate with the controller under an arrangement where this connection is masked/shielded from the radiation of the dominant system.

Figure 3:
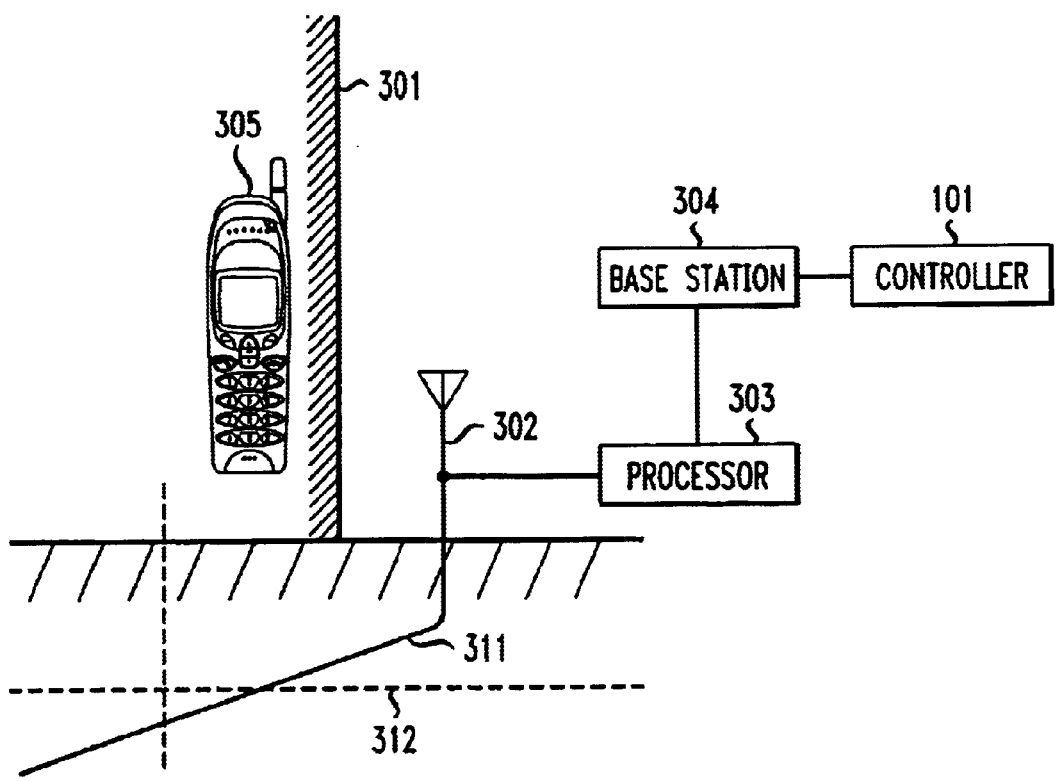
FIG. 3 is a view of an antenna arrangement used for access in a secondary system.
Figure 4:
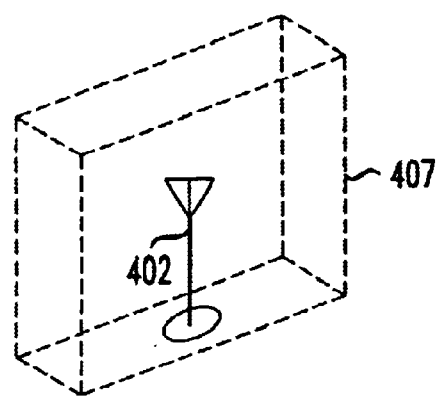
FIG. 4 is a view of another antenna arrangement used for access in a secondary system.

In the exemplary embodiment the APSA device radiates both an analog and a digital access channel which is in the same frequency range as such signal allotted to the macro-cellular primary communications system overlapping the secondary system served by APSA 125. Suggested exemplary shielding/masking techniques are illustrated in FIGS. 3 and 4.

In the exemplary embodiment, this miniature base station is a cellular radio base station, which can establish both analog and digital channels. This base station may be based on Digital Radio Processing (DRP) techniques, which accomplish transmission and reception of cellular radio signals by use of numerical rather than conventional analog signal processing techniques. These radio techniques are well known in the art and need not be further discussed herein.

The APSA 125 and VAPs 105 and 106, in the exemplary embodiment, are miniature base stations and have capability for communicating with the wireless telephone using both analog and digital (i.e., TIA/EIA-136) formats. These may have multiple channel capability allowing transmission and reception on several channels simultaneously allowing differing modulation and channel-coding techniques. As shown in the FIG. 1 they may be connected to a switch, or a controller including a switch, by standard line interfaces (e.g., ISDN BRI, ISDN PRI, 10Base T, Trunk/PRI, etc).

The APSA 125 may be located at an entrance or on the periphery or a combination thereof of the operating extent of the secondary communication system. It may operate in an enclosed area (e.g., entrance lobby) or in an enclosure, which is exposed to the environment. If at an entrance it may be combined with a premise admittance system, which also responds radio-linked badges used for entry authentication. The transmission power of the analog and digital access signals are set at a level so that access procedures must be performed with the wireless handset located within a tightly defined space (i.e., normally within inches of the APSA antenna)

An exemplary APSA 125 operating environment is illustrated schematically in FIG. 3. This embodiment presents the wireless telephone user with a surface 301, which the wireless telephone handset 305 is placed against, according to provided instructions. The ASPA antenna is located just behind the surface, which is transparent to electromagnetic radiation in the illustrative embodiment. The distance and signal strength radiated by the antenna 302 is selected so that the field strength presented to the wireless telephone handset at the surface 301 exceeds the radiated signal strength of the overlapping primary or dominant system. A graph of signal strength curves positioned below the schematic relates the signal strength to distance from the secondary system access antenna. It compares signal field strength of both the secondary and dominant systems related to a linear distance from the secondary antenna. As is apparent the signal strength of the secondary system radiation exceeds the ambient field strength of the dominant system at distances very close to the antenna of the secondary system.

The antenna 302 is connected to RF processing circuitry 303, which in turn is connected, to the base station equipment 304. This in turn is connected to the controller 101. The APSA 125 is advantageously located at some location easily accessed by potential new users of the secondary system. Such location might be an entrance to a building containing the secondary system. Other locations will suggest themselves to those skilled in the art.

An alternative arrangement is illustrated in the schematic of FIG. 4, in which the secondary system access antenna 402 is shielded from ambient radiation of the dominant system. In the exemplary embodiment of FIG. 4 the shielding mechanism is a box 407 surrounding the antenna 402 to prevent/reduce the level of ambient radiation of the dominant within the box. Within the box 407 the wireless telephone may interact solely with the secondary system antenna 402 independent of radiation of the dominant system.

Alternative arrangements may use an external antenna having highly directional radiation constructs to permit access despite the radiant level of the dominant system. This arrangement may be useful if the antenna and APSA circuitry are not co-located or other placement restrictions exist.

Figure 2:
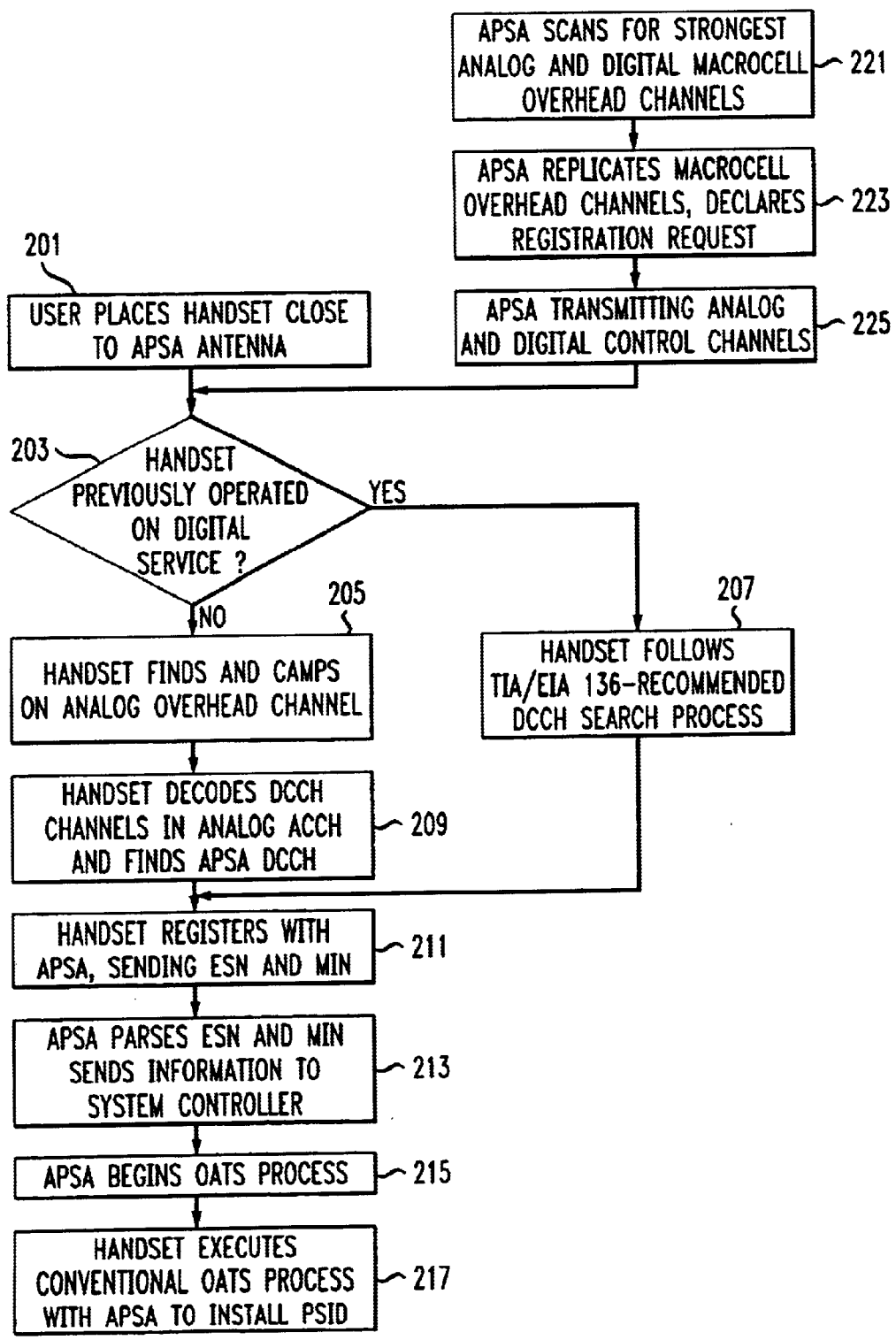
FIG. 2 is a flow chart of a process by which a wireless telephone accesses and is authenticated by the wireless communication system of FIG. 1.

An illustrative procedure for activating a wireless telephone in the secondary communication system, following exemplary TIA/EIA-136 procedures, is shown in the process flow chart of FIG. 2. This process is based on continuing signal activity of an active secondary communication system. As indicated in block 221 the APSA base station continually scans for detecting Analog and Digital macrocell overhead channels of a dominant communications system. These signals, as per block 223, are replicated by the APSA for receiving registration requests. The APSA transmits these replicated signals, as per block 225, as digital and analog control channels on the same frequencies used in the primary macrocell.

The activation/access process in initiated when the user places a handset (i.e., wireless telephone) close to an APSA antenna, as per block 201. An inquiry is performed, as per decision block 203, to determine if the handset has previously operated on digital service. If it has not the handset finds and locks on to an analog overhead channel, as per block 205. The handset decodes the DCCH (Digital Control Channels) in analog ACCH (Analog Control Channels), as per block 209, and finds the DCCH of the APSA. The handset then registers with the APSA sending it its ESN and MIN, as per block 211.

If the decision of block 203 determines that the handset has previously operated on digital service the flow process proceeds to the instructions of block 207 and the handset as instructed follows the TIA/EIA-136 recommended search procedure. Registration is achieved with the APSA following the sending of the handset's ESN and MIN.

The APSA parses ESN and MIN and, as per block 213, sends it to the System controller of the secondary system. The APSA as per block 215 begins an OATS process and as per block 217 the handset executes the conventional OATS process with the APSA to install the PSID which is a private SID causing the handset to preferentially lock onto the DCCH of the private system.

OATS (Over-the-air-Activation TeleService) is a standard process (TIA/EIA-136-720) to support data exchange between a wireless telephone (i.e., a mobile station, MS) and a customer service center. OATS provides guidance to properly providing message flows for activation of an unprogrammed wireless telephone and for modifying of NAM parameters in a previously activated wireless telephone. FIGS. 5, 6, 7 and 8 to show typical message flows that support the OATS procedures. The preamble message flow is shown in FIG. 5 and in FIG. 6 a message flow example over a DTC (Digital Traffic Channel) is shown for activation of an unprogrammed wireless telephone (i.e., MS).

Figure 7:
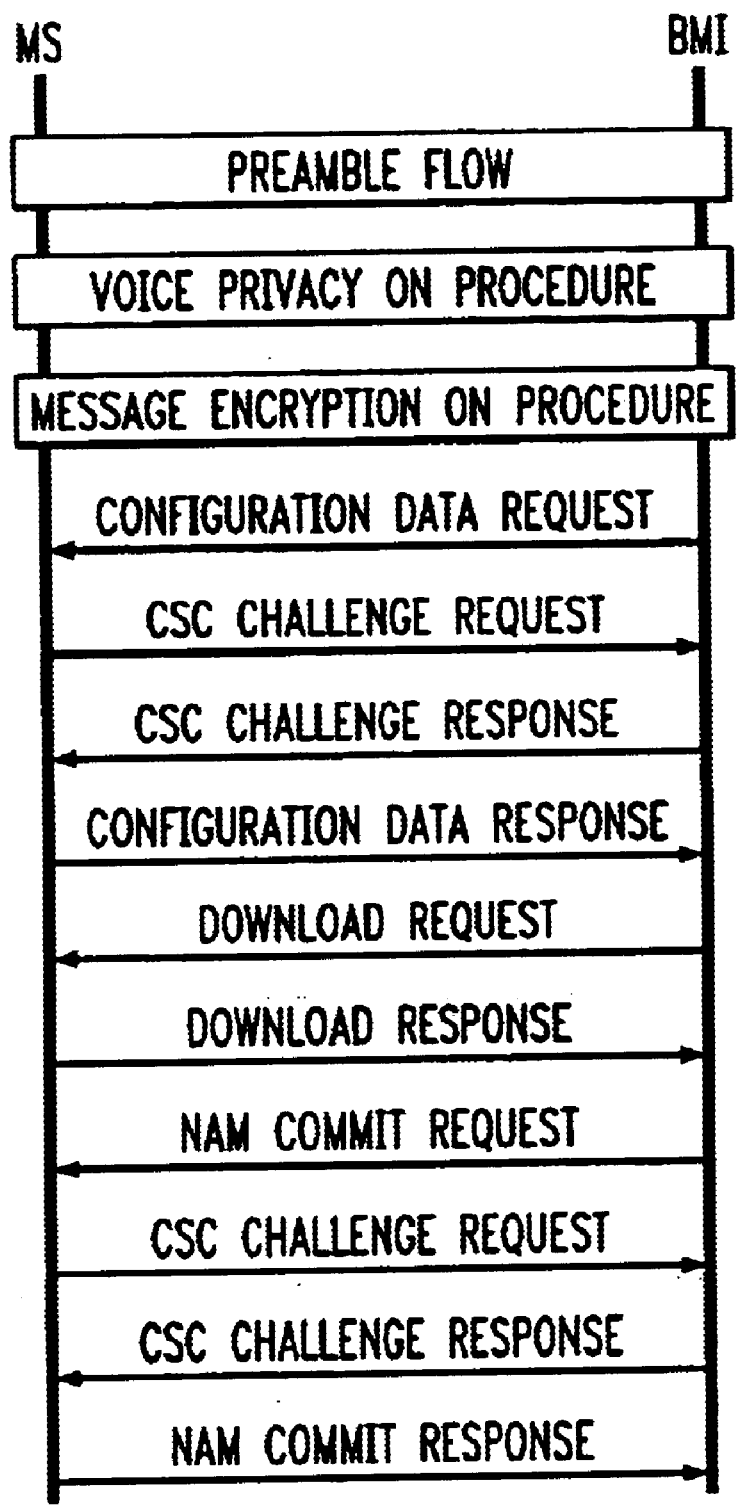
Figure 8:
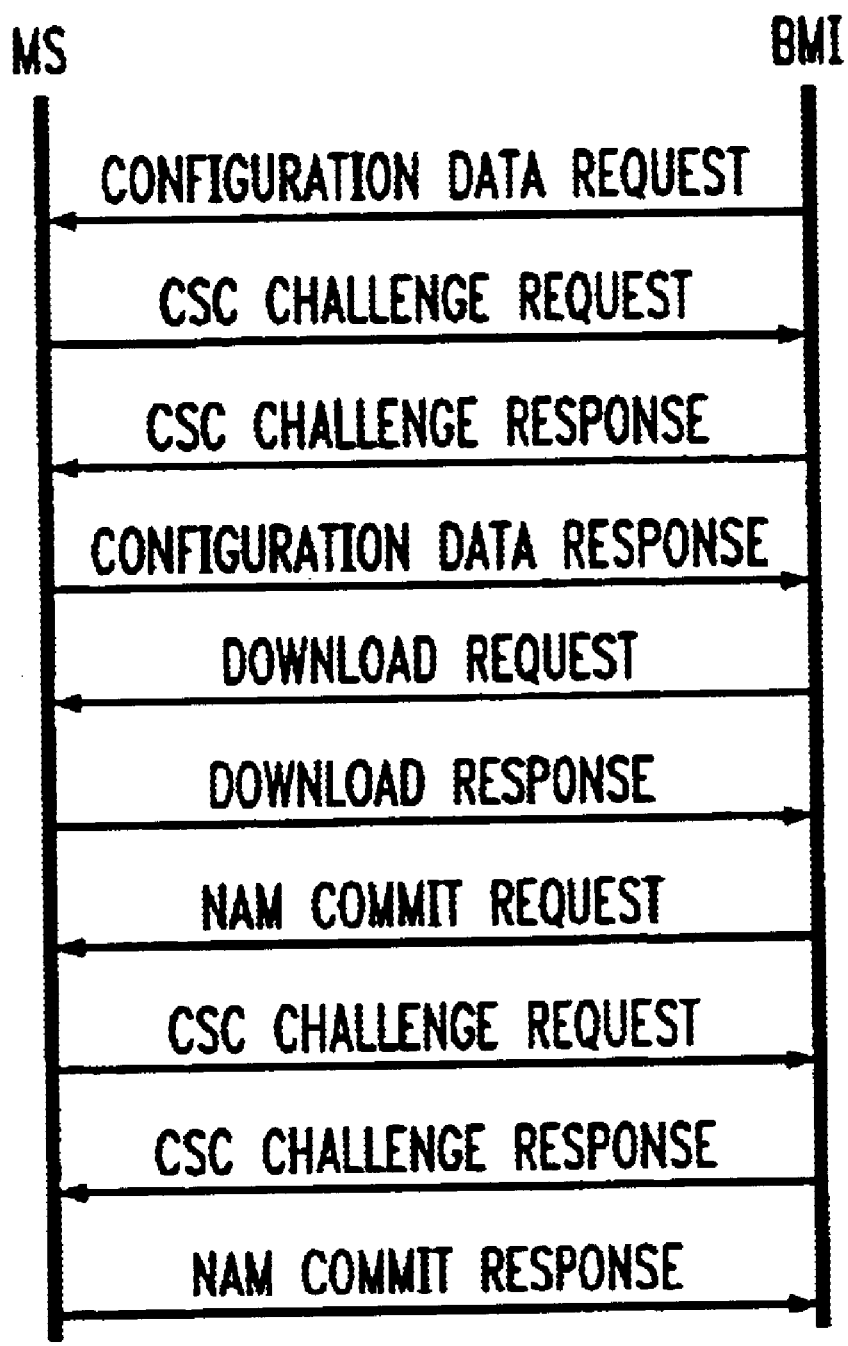

Message flow, over a DTC, for a previously activated wireless telephone is shown in the FIG. 7 and message flow over a DCCH for a previously activated wireless telephone is shown in the FIG. 8. OATS is a procedure known to those skilled in the art and further discussion is not believed necessary.

Figure 9:
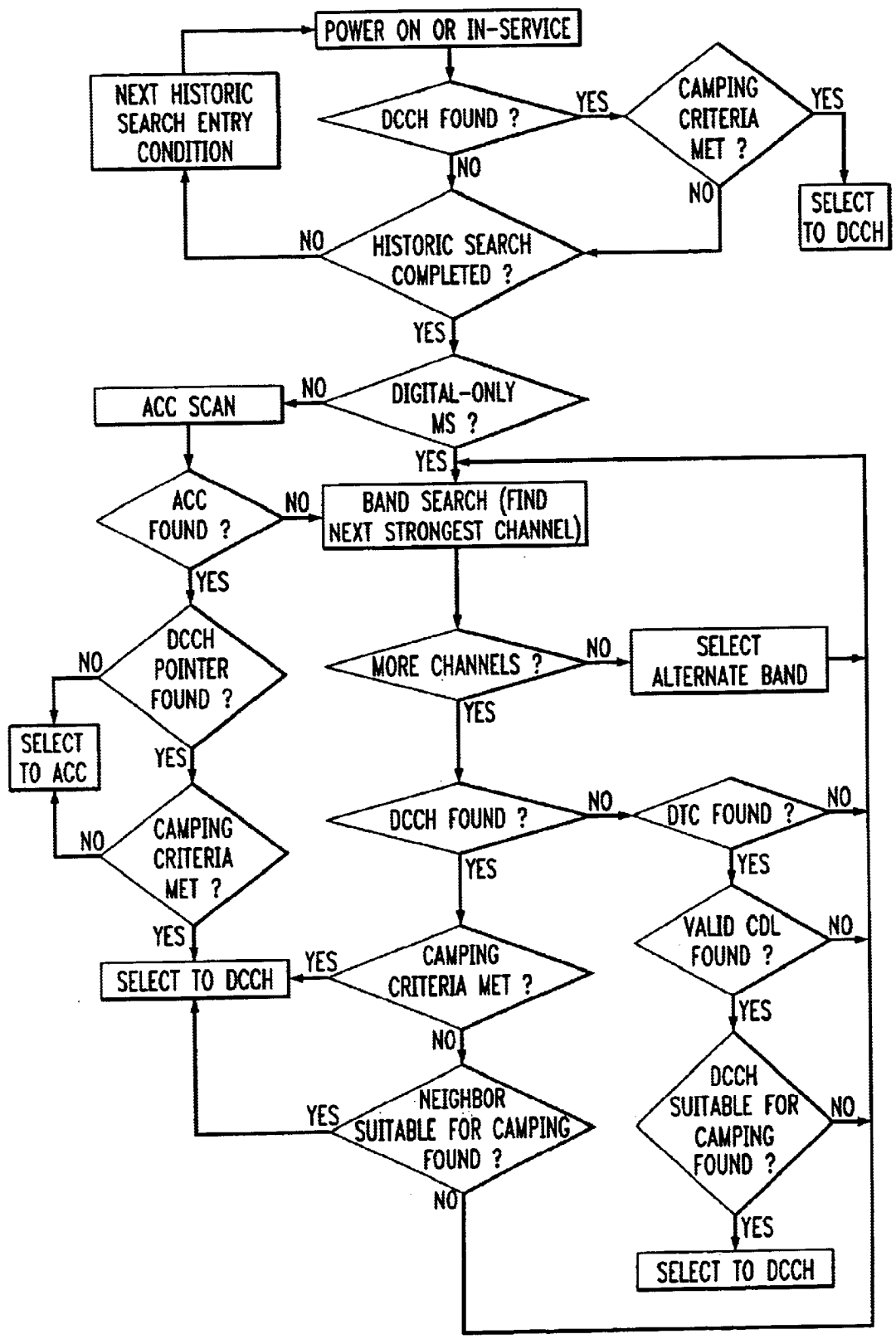
FIG. 9 is a flow chart of the TIA/EIA-136 DCCH search procedure.

A DCCH search reference model is shown in flow chart form in the FIG. 9. It basically illustrates that the handset is powered on or in service and a DCCH is searched for. Analog and Digital is differentiated and a scan is made for a control channel. The process depends upon a scan of control channels and once a suitable control channel with acceptable service is found the handset stops scanning and it camps on (i.e., locks on) the acceptable service. This procedure is part if TIA/EIA-136 and is well known to those skilled in the art. Further description is not believed necessary.

The service portion of this invention utilizes an intranet-based application program to communicate with the private system controller in packet format. In a fully automatic instantiation, the controller receives the handset's MIN and ESN from the APSA unit, and may interact and/or update an authentication database to admit the new user. Such updates could conform to one of several service scenarios, depending on the strength of access privileges, which may be deemed appropriate. The following are examples, but one skilled in the art will recognize that other levels are possible:

1. Verify that the user is a member of the organization, which sponsors the private user community via access to a corporate database. Such users may be granted unlimited period of access with full privileges.
2. Identify the user as an invited visitor to the organization who wishes to access the system for a limited period of time and with either unlimited or limited privileges. In this case, security attendant intervention would be required to authorize access and active period. This operation could be accommodated by an Intranet application page available at the security attendant's location.
3. Identify the user as a macrocellular subscriber (by accessing the macrocellular subscriber database) who will be allowed to access the system in order to achieve improved service in the building, but whose service will be billed through the macrocellular subscription.
4. Identify the user as having emergency only (911) authorization while in the building.

Alternatively, an Internet-connected database accessible directly by individuals requesting in-building service could permit insertion of mobile phone number and service provider information in advance (with appropriate security firewalls). Access to this database would allow self-administration of services within the building, either for a fee or for no-charge use. As an example of a situation where such a service would be useful is at a hotel or airline preferred-customer club.

Following user validation, via the designated database(s), the controller interworks with the APSA unit to transmit a System ID Message (PSID/RSID). This message, working with software in the handset, installs the PSID into the Number Assignment Module (NAM) memory area using OATS. Following the requirements of TIA/EIA-136, after the handset is programmed with a new Private SID, it preferentially locks onto the DCCH of the private system.

This invention could also be used to provision so-called "TelePoint-like" service to users in a particular local environment, such as malls, attractions, and conventions. Such service would allow calls to be handled by a private cellular environment separately from the macrocellular system. Such applications could provide different call charges, special features (e.g. enhanced local calling plans), or allow access to "underlay" cellular systems operating in service area covered by a CAI-standard other than that used by the handset desiring service (e.g. encapsulated TIA/EIA-136 service in a European GSM service area, such as at an international airport). In these instances, a Residential SID may be used instead of the Private SID, but other procedures remain the same.

Figure 10:
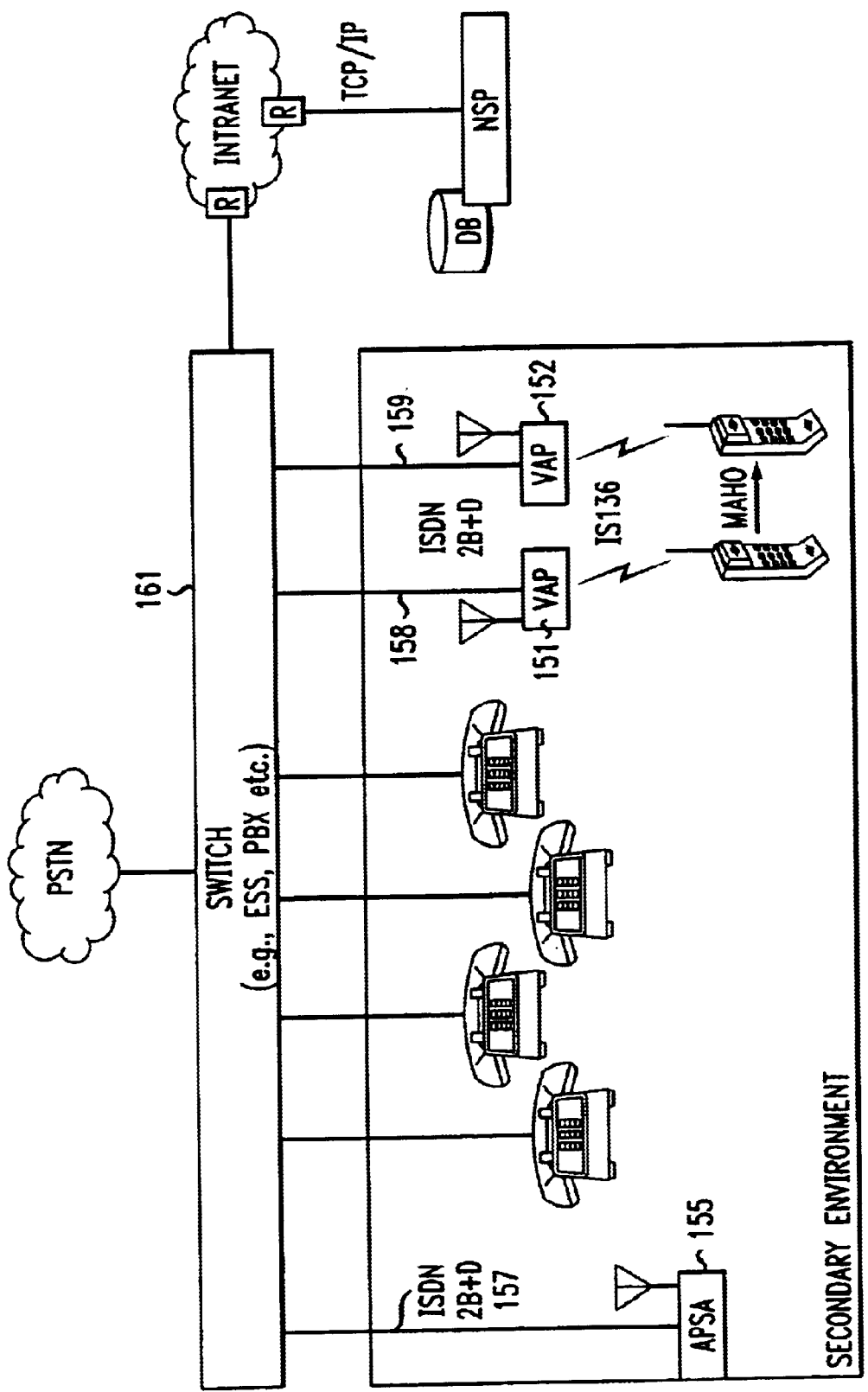
FIG. 10 is a block schematic of an alternate service architecture to that of FIG. 1.

While the invention has been exemplified in a specific embodiment, it is readily apparent that many variations thereof exist which fall within the scope of the invention. Practice of these variations is within the scope of the invention. An exemplary variation is shown in the FIG. 10. The operating environment may be a wireless Centrex environment in a home or small office environment in which wireless or cordless communication devices are connected to a public network such as an internet or PSTN (Public Switched Telephone network). In this embodiment the voice access ports (VAPs) 151,152 and APSA 155 are connected via ISDN/BRI lines 157, 158, 159 to a local service provider's public digital switch 161 (e.g., 5ESS, DMS 100 switches, etc.). Many other variations, of this invention, are equally envisioned by those skilled in the art.

What is claimed is:

1. A secondary wireless communication system overlapped by a dominant wireless communication system, and including radio access for activation and authentication of a wireless telephone in the secondary wireless communication system, comprising:
   an automated private service activation (APSA) port for accepting access requests of a wireless telephone seeking activation in the secondary wireless communication system;
   the APSA port providing an access control channel radiating signals at a level exceeding a signal level of the access control channel only within limited spatial constraints; and
   a providing space for receiving wireless telephone for activation in the secondary wireless communication system.

2. The secondary wireless communication system of claim 1, further comprising:
   the APSA port being part of a cellular base station having both analog communication channels and digital communication channels which operate under the TIA/EIA-136 standard.

3. The secondary wireless communication system of claim 2, further comprising:
   the APSA port includes a surface covering an antenna for abutting a wireless telephone against and communicating a control channel to the wireless telephone at a signal level sufficient to achieve access and authentication and exceeding at that abutting space a control channel signal level of the overlapping dominant wireless communication system.

4. The secondary wireless communication system of claim 2, further comprising:
   the APSA port further including an antenna accessible to a wireless telephone seeking access and authentication and including shielding for blocking a control channel signal level of the overlapping dominant wireless communication system.

5. The secondary wireless communication system of claim 1, further comprising:
   a system controller for providing digital switching and service features connected to the APSA port via a standard line interface.

6. The secondary wireless communication system of claim 5, further comprising:

the controller further including a Network Service Platform (NSP) for providing specific service and management functions.

7. A method of accessing and achieving authentication from a secondary wireless communication system in a region overlapped by a dominant wireless communication system, comprising the steps of:

creating access signal space in which radiated access control signal levels of the secondary wireless communication system within the signal space exceed access control signal levels of the dominant wireless communication system;

positioning a wireless telephone seeking access within the access signal space and powering up the wireless telephone;

searching by the wireless telephone for the strongest control channel;

selecting the control channel of the secondary wireless communication system by reason of positioning of the wireless telephone within the access space; and authorizing and authenticating the wireless telephone for operation within the secondary wireless communication system.

8. The method of claim 7, further comprising the steps of:

enabling the secondary wireless communication system to interwork with the dominant wireless communication system; and authorizing and authenticating performed in accordance with TDMA standards recognized under TIA/EIA-136.

9. The method of claim 7, further comprising the steps of:

enabling the secondary wireless communication system to interwork with the dominant wireless communication system; and authorizing and authenticating performed in accordance with analog standards.

10. The method of claim 7, further comprising the step of:

authorizing and authenticating based on information retrieved from a database of the dominant wireless communication system to enable billing of service through subscription to that system.

11. The method of claim 7, further comprising the step of:

authorizing and authenticating structured to use a Subscriber IDentification (SID) code, wherein the SID code is inserted into the wireless telephone at initial authorization and authentication, and wherein the SID code is unique to the secondary wireless systems so that post initial authorization and authentication the wireless telephone preferentially locks on to the secondary wireless communication system.

12. The method of claim 11, further comprising the step of:

operating the wireless telephone in the secondary wireless system in substitution for the dominant wireless communication system.

13. A method of activating and authenticating a wireless telephone of a new user in a secondary wireless communication system in a region overlapped by a dominant wireless communication system, comprising the steps of:

enabling the activating and authenticating within a limited sub-region of the region overlapped by a dominant wireless communication system and within that sub-region including the steps of:

providing a mobile identification number (MIN) and an electronic serial number (ESN) from an Automatic Private Service Activation (APSA) unit of the secondary system; and interact with a secondary system database to provide a record and enable service to the new user.

14. The method of claim 13, further a comprising the step of:

installing a private system identification number (PSID) into a number assignment Module (NAM).

15. The method of claim 13, further comprising the step of:

installing by an over the air Activation system (OATS) process.

16. The method of claim 13, further comprising:

locking onto a Digital Control Channel (DCCH) of the secondary wireless system.

17. A secondary wireless communication system overlapped by a dominant wireless communication system, and including radio access for activation and authentication of a wireless telephone in the secondary wireless communication system, comprising:

an internet/intranet-connected database including user lists and user features and characteristics and accessible to individuals requesting service in the secondary wireless communication system and allowing the individuals to insert information concerning mobile station number and access information in advance of implementing access requests;

an automated private service activation (APSA) port for accepting the access requests of a wireless telephone seeking activation in the secondary wireless communication system.

18. The wireless communication system of claim 17, further comprising:

the APSA port providing an access control channel radiating signals at a level exceeding a signal level of the access control channel only within limited spatial constraints; and a providing space for receiving wireless telephones for activation in the secondary wireless communication system.

19. In a wireless centrex environment, a secondary wireless communication system overlapped by a dominant wireless communication system, and including radio access for activation and authentication of a wireless telephone in the secondary wireless communication system, comprising:

a plurality of voice access ports (VAP) connected to a local digital switch associated with a public switched telephone network (PSTN); and an automated private service activation (APSA) port for accepting the access requests of a wireless telephone seeking activation in the secondary wireless communication system;

wherein the APSA port is connected to a local digital switch associated with a PSTN; and wherein the APSA port provides an access control channel radiating signals at a level exceeding a signal level of the access control channel only within limited spatial constraints.

\* \* \* \* \*